US012200056B2

(12) United States Patent
Maydiga et al.

(10) Patent No.: US 12,200,056 B2
(45) Date of Patent: Jan. 14, 2025

(54) NETWORK COMMUNICATION SYSTEM AND PROCESS TO OPTIMIZE NETWORK PERFORMANCE

(71) Applicant: GM Global Technology Operations LLC, Detroit, MI (US)

(72) Inventors: Sudhakaran Maydiga, Troy, MI (US); Steve DiBella, Troy, MI (US); Katrina M. Schultz, Clarkston, MI (US); Grant Ayodele Ebun Soremekun, Pacifica, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 594 days.

(21) Appl. No.: 17/533,955

(22) Filed: Nov. 23, 2021

(65) Prior Publication Data

US 2023/0164221 A1 May 25, 2023

(51) Int. Cl.
*H04L 43/16* (2022.01)
*H04L 67/12* (2022.01)

(52) U.S. Cl.
CPC .............. *H04L 67/12* (2013.01); *H04L 43/16* (2013.01)

(58) Field of Classification Search
None
See application file for complete search history.

(56) References Cited

U.S. PATENT DOCUMENTS 8,310,353 B2 11/2012 Hinninger et al.
8,645,001 B2 2/2014 Basson et al.
8,665,700 B2 3/2014 Jiang et al.
9,600,372 B2 3/2017 Jiang et al.
9,994,146 B2 6/2018 Achiaz
10,565,148 B2 2/2020 Giusto et al.
2005/0117364 A1 6/2005 Rennick et al.
2017/0053530 A1* 2/2017 Gogic .................... H04L 67/12
2019/0258727 A1* 8/2019 Schmotzer ............ G06F 40/242
2021/0208588 A1 7/2021 Gray et al.

* cited by examiner

*Primary Examiner* — Pamit Kaur
(74) *Attorney, Agent, or Firm* — Vivacqua Crane, PLLC

(57) ABSTRACT

A computer is provided for a network communication system of a motor vehicle. The system includes a central gateway and a plurality of electronic control units (ECUs) coupled to the central gateway. The computer includes one or more processors and a computer readable medium (CRM) coupled to the processors. The processor is programmed to receive an input database including a plurality of messages with a plurality of unique periodic rates. The processor is further programmed to assign a plurality of delayed start times for associated messages, with a number of the messages transmitted at each of the delayed starting times being limited to a predetermined maximum threshold. The processor is further programmed to generate an output database including the delayed start times, such that the ECUs are coded based on the output database to transmit the messages at the associated delayed start times to decrease a congestion of the system.

15 Claims, 2 Drawing Sheets

NETWORK COMMUNICATION SYSTEM AND PROCESS TO OPTIMIZE NETWORK PERFORMANCE

INTRODUCTION

The present disclosure relates to network communication systems, and more particularly to a network communication system and process for managing data traffic to optimize network performance and decrease congestion.

Modern vehicles can have network configurations with serial data traffic design for various traffic modes, including periodic, periodic with event, and event only. In these networks, messages can be transmitted in a way that leads to build-ups at certain time intervals, which can in turn cause electronic control units (ECUs) to miss messages and adversely affect vehicle performance.

Thus, while existing network communication systems can achieve their intended purpose, there is a need for a new and improved network communication system that addresses these issues.

SUMMARY

According to several aspects of the present disclosure, a computer is provided for a network communication system ("system") of a motor vehicle. The system includes a central gateway and a plurality of electronic control units (ECUs) coupled to the central gateway. The computer includes one or more processors and a non-transitory computer readable storage medium (CRM) coupled to the processor. The CRM stores instructions, such that the processor is programmed to receive an input database. The input database includes a plurality of messages adapted to be transmitted by the ECUs on the system at a plurality of unique periodic rates. The processor is further programmed to assign a plurality of delayed start times for transmitting an associated one of the messages. The number of the messages that are transmitted at each of the delayed starting times is limited to a predetermined maximum threshold. The processor is further programmed to generate an output database. The output database includes the delayed start time for each one of the messages, such that the ECUs are coded based on the output database to transmit the messages at the associated delayed start times for decreasing a congestion of the system.

In one aspect, the input database includes a plurality of message identifications (IDs) and a plurality of initial offset times for the associated messages.

In another aspect, the processor is further programmed to compare the initial offset time of each one of the messages to zero. The processor is further programmed to assign the current delayed start time to the associated message, in response to the processor determining that the initial offset time associated with the message is equal to zero.

In another aspect, the processor is further programmed to define the delayed start time for the associated message as being equal to the initial offset time for the associated message, in response to the processor determining that the initial offset time is not equal to zero.

In another aspect, the processor is further programmed to determine a message count and compare the message count to a predetermined maximum threshold. The processor is further programmed to increase the message count by one and assign the current delayed start time to the associated message, in response to the processor determining that the message count at the current delayed start time is less than or equal to the predetermined maximum threshold.

In another aspect, the processor is further programmed to increase the delayed start time of the associated message by a predetermined increment, in response to the processor determining that the message count is not less than or equal to the predetermined maximum threshold.

In another aspect, the processor is further programmed to reset the message count to one, in response to the processor determining that the message count is not less than or equal to the predetermined maximum threshold.

In another aspect, the processor is further programmed to determine if any one of the messages has not been assigned one of the delayed start times. The processor is further programmed to generate the output database, in response to the processor determining that all of the messages have been assigned an associated one of the delayed start times.

According to several aspects of the present disclosure, a network communication system is provided for a motor vehicle. The system includes a computer, which has one or more processors and a non-transitory computer readable storage medium (CRM) coupled to the processor. The CRM stores instructions, such that the processor is programmed to receive an input database. The input database includes a plurality of messages adapted to be transmitted at a plurality of unique periodic rates. The processor is further programmed to assign a plurality of delayed start times to an associated one of the messages. The number of the messages that are transmitted at each of the delayed starting times is limited to a predetermined maximum threshold. The processor is further programmed to generate an output database. The output database includes the delayed start times for each one of the messages. The system further includes a central gateway and a plurality of electronic control units (ECUs) coupled to the central gateway. The ECUs are coded based on the output database to transmit the messages at the associated delayed start times for decreasing a congestion of the network communication system.

In one aspect, the input database includes a plurality of message identifications (IDs) and a plurality of initial offset times for an associated one of the messages.

In another aspect, the processor is further programmed to compare the initial offset time of each one of the messages to zero. The processor is further programmed to assign the delayed start time to the associated message, in response to the processor determining that the initial offset time associated with the message is equal to zero.

In another aspect, the processor is further programmed to define the delayed start time for the associated message as being equal to the initial offset time for the associated message, in response to the processor determining that initial offset time is not equal to zero.

In another aspect, the processor is further programmed to determine a message count and compare the message count to a predetermined maximum threshold. The processor is further programmed to increase the message count by one and assign the current delayed start time to the associated message, in response to the processor determining that the message count at the current delayed start time is less than or equal to the predetermined maximum threshold.

In another aspect, the processor is further programmed to increase the current delayed start time of the associated message by a predetermined increment, in response to the processor determining that the message count is not less than or equal to the predetermined maximum threshold.

In another aspect, the wherein the at least one processor is further programmed to reset the message count to one, in response to the processor determining that the message count is not less than or equal to the predetermined maximum threshold.

In another aspect, the processor is further programmed to determine if any one of the messages has not been assigned one of the delayed start times. The processor is further programmed to generate the output database, in response to the processor determining that all of the messages have been assigned an associated one of the delayed start times.

According to several aspects of the present disclosure, a process is provided for manufacturing a network communication system (system). The system includes a central gateway, a plurality of electronic control units (ECUs), and a computer, which has one or more processors and a non-transitory computer readable storage medium (CRM). The process includes receiving, using the processor, an input database including a plurality of messages adapted to be transmitted by the ECUs on the system at a plurality of unique periodic rates. The process further includes assigning, using the processor, a plurality of delayed start times to an associated one of the messages. The number of the messages that are transmitted at each of the delayed starting times is limited to a predetermined maximum threshold. The process further includes generating, using the processor, an output database. The output database includes the delayed start times for each one of the messages, such that the ECUs are coded based on the output database to transmit the messages at the associated delayed start times and decrease a congestion of the system.

In one aspect, the input database includes a plurality of message identifications (IDs) and a plurality of initial offset times for an associated one of the messages. The process further includes comparing, using the processor, the initial offset time of each one of the messages to zero. The process further includes assigning, using the processor, the current delayed start time to the associated message, in response to the processor determining that the initial offset time is equal to zero. The process further includes defining, using the processor, the delayed start time of the associated message as being equal to the initial offset time of the associated message, in response to the processor determining that the initial offset time is not equal to zero.

In another aspect, the process further includes determining, using the processor, a message count. The process further includes comparing, using the processor, the message count to a predetermined maximum threshold. The process further includes increasing, using the processor, the message count by one and assigning the current delayed start time to the associated message, in response to the processor determining that the message count at the delayed start time is less than or equal to the predetermined maximum threshold.

In another aspect, the process further includes increasing, using the processor, increase the delayed start time of the associated message by a predetermined increment, in response to the processor determining that the message count is not less than or equal to the predetermined maximum threshold.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Figure 1:
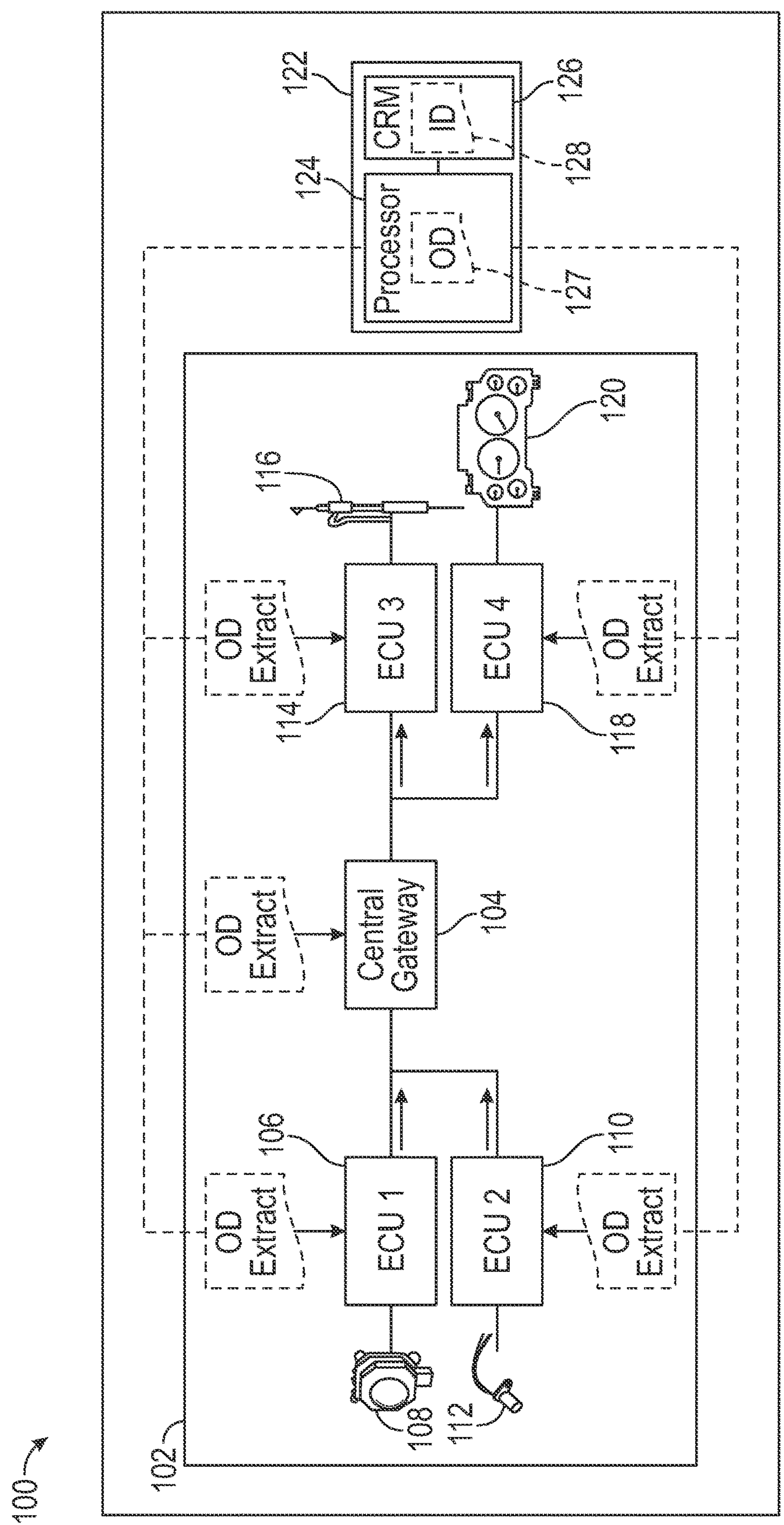
FIG. 1 is a schematic representation of one non-limiting example of a motor vehicle having a network communication system with a computer for decreasing congestion in the network communication system.

The following description is merely exemplary in nature and is not intended to limit the present disclosure, application, or uses. Although the drawings represent examples, the drawings are not necessarily to scale and certain features may be exaggerated to better illustrate and explain a particular aspect of an illustrative example. Any one or more of these aspects can be used alone or in combination within one another. Further, the exemplary illustrations described herein are not intended to be exhaustive or otherwise limiting or restricting to the precise form and configuration shown in the drawings and disclosed in the following detailed description. Exemplary illustrations are described in detail by referring to the drawings as follows:

Referring to FIG. 1, one non-limiting example of a motor vehicle 100 has a network communication system 102 (system) that transmits messages in a way that minimizes the build-up of messages at certain time intervals and decrease the risk of messages being lost during vehicle operation. In this non-limiting example, the system 102 generally includes a central gateway 104, a first electronic control unit 106 (ECUs), a first sensor 108 coupled to the first ECU 106, a second ECU 110, a second sensor 112 coupled to the second ECU 110, a third ECU 114, an actuator 116 coupled to the third ECU 114, a fourth ECU 118, a display device 120 coupled to the fourth ECU 118, and a central gateway 104 coupled to the ECUs 106, 110, 114, 118. It is contemplated that the motor vehicle can have other suitable systems with any number of ECUs, sensors, actuators, display devices, gateways, and/or other suitable devices. As described in detail below, the ECUs 106, 110, 114, 118 are coded for transmitting messages at a plurality of delayed start times, with a maximum number of messages being transmitted at any time interval to decrease congestion and optimize network performance.

The system 102 further includes a computer 122 separate from the motor vehicle 100 that determines, during a design or development phase, the delayed start times of each one of the messages transmitted by an associated one of the ECUs 106, 110, 114, 118. The computer 122 includes one or more processors 124 and a non-transitory computer readable storage medium 126 (CRM) coupled to the processor 124. The CRM 126 stores instructions, such that the processor is programmed to receive an input database 128 including a plurality of messages adapted to be transmitted at a plurality of unique periodic rates. The input database 128 includes a plurality of message identifications (IDs) and a plurality of initial offset times for an associated one of the messages.

The processor 124 is further programmed to assign a plurality of delayed start times to an associated one of the messages, with the number of the messages that are transmitted at each of the delayed starting times being limited to a predetermined maximum threshold. In this way, the system 102 does not experience congestion or a bottleneck of messages. As but one non-limiting example, the processor 124 can be programmed to generate an output database 127, as described in more detail below, that causes ECUs to transmit a maximum of 10 messages at each time interval, e.g., 10 ms after start, and another maximum of 10 messages 20 ms after start and so on. It is contemplated that the predetermined maximum threshold can be above or below 10 messages at any delayed start time, and the delayed start times can be separated by any increments above or below 10 ms. More specifically, the processor 124 is further programmed to compare the initial offset time of each one of the messages to zero. If the processor 124 determines that the initial offset time associated with the message is equal to zero, the processor 124 assigns the current delayed start time to the associated message. If the processor 124 determines that the initial offset time is not equal to zero, the processor 124 is further programmed to define the delayed start time for the associated message as being equal to the initial offset time for the associated message.

The processor 124 is further programmed to determine a message count and compare the message count to the predetermined maximum threshold. The processor 124 is further programmed to increase the message count by one and assign the delayed start time to the associated message, in response to the processor 124 determining that the message count at the delayed start time is less than or equal to the predetermined maximum threshold. Continuing with the previous non-limiting example where the predetermined maximum threshold is 10 messages at the delayed start time of 10 ms, the processor 124 is programmed to increase the message count after start by one when less than 10 messages were previously assigned to start at 10 ms.

The processor 124 is further programmed to increase the current delayed start time of the associated message by a predetermined increment and reset the message count to one, in response to the processor 124 determining that the message count is not less than the predetermined maximum threshold. Continuing with the previous non-limiting example where the predetermined maximum threshold is 10 messages at the delayed start time of 10 ms, the processor 124 increases the delayed start time of the associated message by an increment of 10 ms to increase the delayed start time from 10 ms to 20 ms.

The processor 124 is further programmed to determine if any one of the messages has not been assigned one of the delayed start times; and generate the output database 127, in response to the processor 124 determining that all of the messages have been assigned an associated one of the delayed start times. The processor 124 is further programmed to generate the output database 127 including the assigned delayed start times for each one of the messages. The ECUs 106, 110, 114, 118 are coded based on the output database 127 to transmit the messages at the associated delayed start times for decreasing congestion and optimizing network performance of the system 102.

Figure 2:
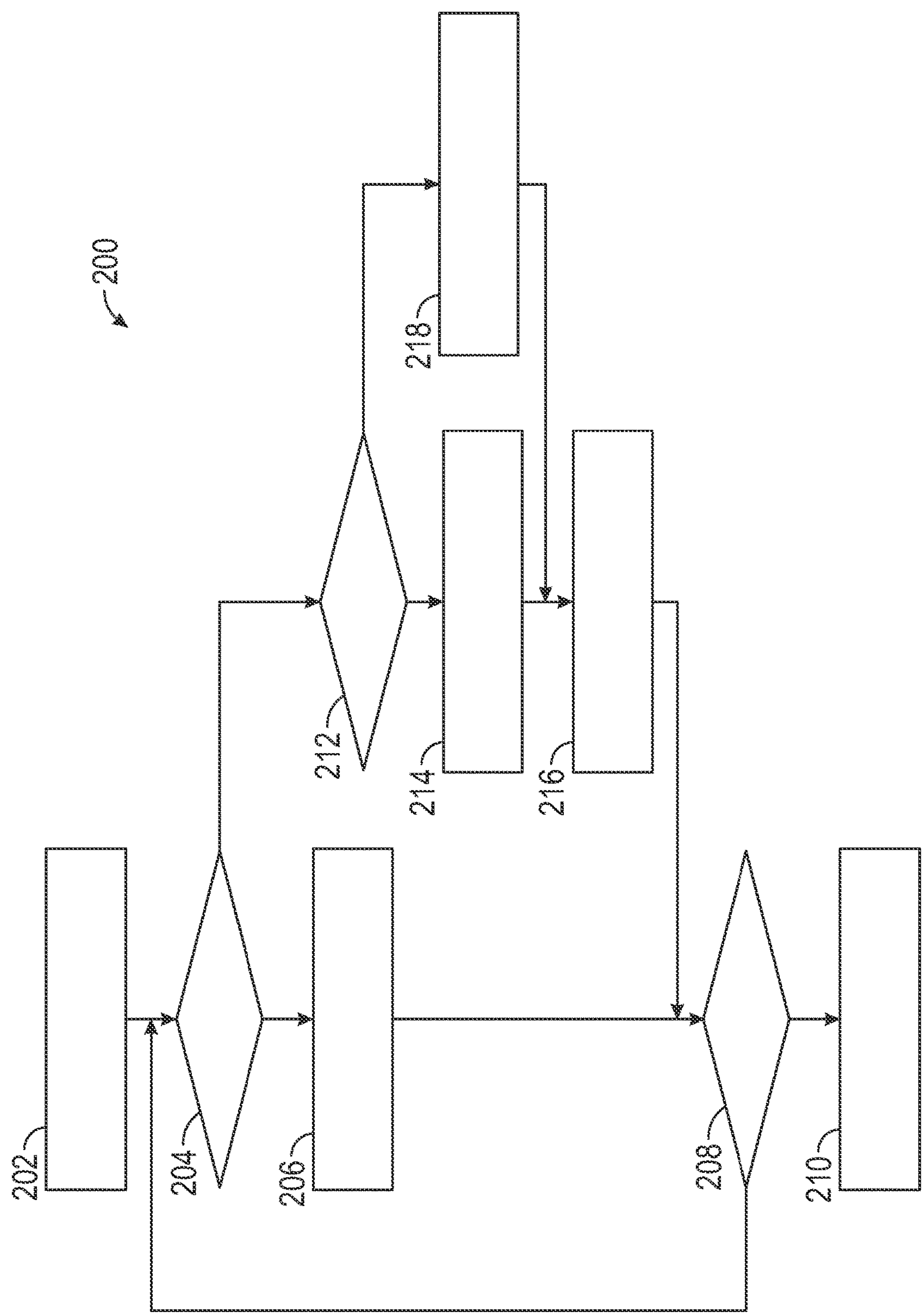
FIG. 2 is a flow chart of one non-limiting example of a process of manufacturing the network communication system of FIG. 1.

Referring now to FIG. 2, one non-limiting example of a process 200 for manufacturing the system 102 of FIG. 1 begins at block 202, with the processor 124 receiving the input database 128 including the plurality of messages associated with the plurality of unique periodic rates for transmission, e.g., by the ECUs 106, 110, 114, 118 on the system 102. The input database 128 includes the plurality of message identifications (IDs) and the plurality of initial offset times for an associated one of the messages.

At block 204, the processor 124 compares the initial offset time of the associated message to zero. If the processor 124 determines that the initial offset time of the associated message is not equal to zero, the process 200 proceeds to block 206. If the processor 124 determines that the initial offset time of the associated message is equal to zero, the process 200 proceeds to block 212.

At block 206, the processor 124 defines the delayed start time of the associated message as being equal to the initial offset time of the associated message, in response to the processor 124 determining that the initial offset time is not equal to zero. The process 200 then proceeds to block 208.

At block 208, the processor 124 determines if any one of the messages has not been assigned one of the delayed start times. If the processor 124 determines that one or more messages have not been assigned one of the delayed start times, the process 200 returns to block 204 to process the next message from the input database 128. If the processor 124 determines that all messages have been assigned one of the delayed start times, the process 200 proceeds to block 210.

At block 210, the processor 124 generates the output database 127 including the plurality of delayed start times for each one of the messages, and the ECUs 106, 110, 114, 118 are coded based on the output database 127 to transmit the plurality of messages at the associated delayed start times to decrease congestion and optimize network performance.

At block 212, the processor 124 determines the message count for the current delayed start time and compares the message count to the predetermined maximum threshold. If the processor 124 determines that the message count is less than or equal to the predetermined maximum threshold at the delayed start time, the process 200 proceeds to block 214. If the processor 124 determines that the message count is not less than or equal to the predetermined maximum threshold at the delayed start time, the process 200 proceeds to block 218.

At block 214, the processor 124 increases the message count by 1, in response to the processor 124 determining that the message count is less than or equal to the predetermined maximum threshold at the delayed start time. The process 200 then proceeds to block 216.

At block 216, the processor 124 defines the delayed start time as the current delayed start time for the associated message. Continuing with the previous example, the processor 124 may assign a delayed start time of 10 ms to the first message. It is contemplated that the processor 124 can assign any delayed start time above or below 10 ms to the message. The process 200 then proceeds to block 208.

At block 218, the processor 124 increases the delayed start time of the associated message by a predetermined increment and resets the message count to one, in response to the processor determining that the message count is not less than or equal to the predetermined maximum threshold. Continuing the previous example where the predetermined maximum threshold is 10 and the message count is 10, the processor 124 can increase the delayed start time of 10 ms by an increment of 10 ms for a new delayed start time of 20 ms. However, it is contemplated that that the predetermined increment can be above or below 10 ms. The process 200 then proceeds to block 216.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A computer for a network communication system of a motor vehicle, with the network communication system including a central gateway and a plurality of electronic control units (ECUs) coupled to the central gateway, the computer comprising:

at least one processor; and a non-transitory computer readable storage medium (CRM) coupled to the at least one processor and storing instructions such that the at least one processor is programmed to:

receive an input database including a plurality of messages adapted to be transmitted by the ECUs on the network communication system at a plurality of unique periodic rates, wherein the input database includes a plurality of message identifications (IDs) and a plurality of initial offset times for an associated one of the messages;

compare the each one of the initial offset times to zero;

assign a plurality of delayed start times to an associated one of the messages in response to the processor determining that the initial offset time associated with the message is equal to zero, with a number of the messages that are transmitted at each of the delayed starting times being limited to a predetermined maximum threshold; and generate an output database including the plurality of delayed start times for each one of the messages, such that the ECUs are coded based on the output database to transmit the plurality of messages at the associated delayed start times for decreasing a congestion of the network communication system.

2. The computer of claim 1, wherein the at least one processor is further programmed to define the delayed start time for the associated message as being equal to the initial offset time for the associated message, in response to the at least one processor determining that the initial offset time is not equal to zero.

3. The computer of claim 2, wherein the at least one processor is further programmed to:

determine a message count;

compare the message count to a predetermined maximum threshold; and increase the message count by one and assign the delayed start time to the associated message, in response to the at least one processor determining that the message count at the delayed start time is less than or equal to the predetermined maximum threshold.

4. The computer of claim 3, wherein the at least one processor is further programmed to increase the delayed start time of the associated message by a predetermined increment, in response to the at least one processor determining that the message count is not less than or equal to the predetermined maximum threshold.

5. The computer of claim 4, wherein the at least one processor is further programmed to reset the message count to one, in response to the at least one processor determining that the message count is not less than or equal to the predetermined maximum threshold.

6. The computer of claim 5, wherein the at least one processor is further programmed to:

determine if any one of the messages has not been assigned one of the delayed start times; and generate the output database in response to the at least one processor determining that all of the messages have been assigned an associated one of the delayed start times.

7. A network communication system of a motor vehicle, the network communication system comprising:

a computer comprising:

at least one processor; and a non-transitory computer readable storage medium (CRM) coupled to the at least one processor and storing instructions such that the at least one processor is programmed to:

receive an input database including a plurality of messages adapted to be transmitted at a plurality of unique periodic rates, wherein the input database includes a plurality of message identifications (IDs) and a plurality of initial offset times for an associated one of the messages;

compare the each one of the initial offset times to zero;

assign a plurality of delayed start times to an associated one of the messages in response to the processor determining that the initial offset time associated with the message is equal to zero, with a number of the messages that are transmitted at each of the delayed starting times being limited to a predetermined maximum threshold; and generate an output database including the plurality of delayed start times for each one of the messages;

a central gateway coupled to the at least one processor; and a plurality of electronic control units (ECUs) coupled to the central gateway and the at least one processor;

wherein the ECUs are coded based on the output database to transmit the plurality of messages at the associated delayed start times for decreasing a congestion of the network communication system.

8. The network communication system of claim 7, wherein the at least one processor is further programmed to define the delayed start time for the associated message as being equal to the initial offset time for the associated message in response to the at least one processor determining that the initial offset time is not equal to zero.

9. The network communication system of claim 8, wherein the at least one processor is further programmed to:

determine a message count;

compare the message count to a predetermined maximum threshold; and increase the message count by one and assign the delayed start time to the associated message, in response to the at least one processor determining that the message count at the delayed start time is less than or equal to the predetermined maximum threshold.

10. The network communication system of claim 9, wherein the at least one processor is further programmed to increase the delayed start time of the associated message by a predetermined increment, in response to the at least one processor determining that the message count is not less than or equal to the predetermined maximum threshold.

11. The network communication system of claim 10, wherein the at least one processor is further programmed to reset the message count to one, in response to the at least one processor determining that the message count is not less than or equal to the predetermined maximum threshold.

12. The network communication system of claim 11, wherein the at least one processor is further programmed to:

determine if any one of the messages has not been assigned one of the delayed start times; and generate the output database in response to the at least one processor determining that all of the messages have been assigned an associated one of the delayed start times.

13. A process for manufacturing a network communication system, the network communication system including a central gateway, a plurality of electronic control units (ECUs), and a computer having at least one processor and a non-transitory computer readable storage medium, the process comprising:

receiving, using the at least one processor, an input database including a plurality of messages associated with a plurality of unique periodic rates for transmission by the ECUs on the network communication system, wherein the input database includes a plurality of message identifications (IDs) and a plurality of initial offset times for an associated one of the messages;

comparing the each one of the initial offset times to zero;

assigning, using the at least one processor, a plurality of delayed start times for an associated one of the messages in response to the processor determining that the initial offset time associated with the message is equal to zero, with a number of the messages that are transmitted at each of the delayed starting times being limited to a predetermined maximum threshold; and generating, using the at least one processor, an output database including the plurality of delayed start times for each one of the messages, such that the ECUs are coded based on the output database to transmit the plurality of messages at the associated delayed start times for decreasing a congestion of the network communication system.

14. The process of claim 13, further comprising:

determining, using the at least one processor, a message count;

comparing, using the at least one processor, the message count to a predetermined maximum threshold; and increasing, using the at least one processor, the message count by one and assigning the delayed start time to the associated message, in response to the at least one processor determining that the message count is less than or equal to the predetermined maximum threshold.

15. The process of claim 14 further comprising:

increasing, using the at least one processor, the delayed start time of the associated message by a predetermined increment, in response to the at least one processor determining that the message count is not less than or equal to the predetermined maximum threshold.

* * * * *